United States Patent [19]

Hoeppel

[11] Patent Number: 4,479,918
[45] Date of Patent: Oct. 30, 1984

[54] APPARATUS FOR SAFELY GENERATING AND DISPENSING A GAS

[76] Inventor: Raymond W. Hoeppel, P.O. Box 997, Oak View, Calif. 93022

[21] Appl. No.: 366,242

[22] Filed: Apr. 7, 1982

Related U.S. Application Data

[63] Continuation-in-part of Ser. No. 189,803, Sep. 22, 1980, abandoned.

[51] Int. Cl.³ .......................... B01J 4/00; B01J 10/00; B01J 19/26
[52] U.S. Cl. .................................... 422/112; 210/192; 210/754; 422/231
[58] Field of Search ................. 422/103, 29, 111, 112, 422/116, 129, 231, 305; 210/192, 754; 423/477, 478; 261/22, DIG. 65

[56] References Cited

U.S. PATENT DOCUMENTS

| | | | |
|---|---|---|---|
| 3,322,497 | 5/1967 | Martin | 422/129 |
| 4,247,531 | 1/1981 | Hicks | 422/305 |
| 4,250,144 | 2/1981 | Ratigan | 210/754 |
| 4,256,552 | 3/1981 | Sweeney | 210/754 |

Primary Examiner—Bradley Garris

[57] ABSTRACT

A liquid chemical reactant is slowly sucked through capillary tubing into a closed partially evacuated reactor containing a second reactant, thus producing a gas, which is collected and dispensed by a vacuum pump. Simultaneously a small amount of air may be admitted into the reactor to displace the gas formed. Preferably the air enters through the reacting solution, cooling it and stirring it. The liquid reactant preferably is introduced in the immediate vicinity of the air entry. The liquid reactant stops flowing when the vacuum disappears and the reaction stops. The reaction may be automatically controlled by controlling the vacuum by means of a timed valve that bleeds air into the system.

7 Claims, 2 Drawing Figures

APPARATUS FOR SAFELY GENERATING AND DISPENSING A GAS

This is a continuation in part of an application, Ser. No. 189,803, filed Sept. 22, 1980 and abandoned Apr. 9, 1982.

BACKGROUND OF THE INVENTION

This invention relates to fail-safe apparatus for producing a gas by chemical reaction of two or more compounds, at least one of which must be a liquid. It is particularly suited for the generation of corrosive or poisonous gases, such as chlorine, bromine chloride, hydrogen sulfide, and other gases, in view of the safety assured, but it is primarily directed toward the generation of chlorine. Normally these gases are stored in high pressure cylinders and are disposed using expensive equipment, which requires skilled operators and which is costly.

Chlorine has long been used as a sanitizer in applications such as pools, drinking water, and water cooling equipment. The least expensive system for sanitizing with chlorine involves the use of gaseous chlorine but this method suffers the disadvantages listed above.

Where an inexperienced person must apply chlorine, such as in a swimming pool treatment, it is safer to use liquid sodium hypochlorite or solid derivatives such as calcium hyochlorite or combinations of chlorine with cyanuric acid. The latter are by far the most expensive sources of chlorine, the least expensive being calcium hypochlorite, which unfortunately adds calcium salts to the water resulting in scale formation on the sides of the pool, especially in hard water areas, and the pool often must be drained and washed with acid to remove the scale. Liquid sodium hypochlorite is intermediate in cost, but it is very disadvantageous in that it can injure the hands and loses much of its strength on aging in hot weather. Consequently a pool may be unintentionally undertreated, resulting in algae formation. Another disadvantage in using these compounds is that they raise the pH, necessitating the addition of acid at intervals. All of these compounds leave residual salts in the water, which are undesirable.

To overcome these difficulties, applicant produces chlorine gas in a novel fail-safe generator by the reaction of an acid with calcium hypochlorite, the least expensive chlorine compound. Moreover, this compound is very stable and can be stored even in a hot climate for long periods without losing its strength. Using the apparatus described above, chlorine may be safely produced at low cost. Moreover, there is normally no need to add acid to the pool, as the pH stays within the proper range.

SUMMARY OF THE INVENTION

In its simplest form, this invention involves the use of unique apparatus consisting of a sealable reactor, which contains at least one of the reactants in aqueous solution, and another container which holds a liquid reactant under atmospheric pressure. Tubing, having at least a portion with restricted cross-section, moves the liquid reactant very slowly into the closed reactor when the latter is evacuated, and, when the two reactants contact, a gas is formed which is drawn off and dispersed by the pump that produces the vacuum. In order to be fail safe, it is necessary for the height of the discharge end of the tubing, at the point where it enters the vacuum environment, to be at all times elevated above the level of the liquid in the container, so that syphoning of the liquid into the reactor is prevented when the vacuum is broken.

To retard the rate of flow of the liquid reactant, small capillary feed tubing can be used (0.5 to 4 mm in inside diameter), or larger tubing is permissable provided some portion of the tubing incorporates capillary tubing or a multiple-capillary flow restrictor, such as a porous glass ceramic, plastic or organic filter section having a flow rate similar to that of the cited capillary tubing. Such filter may have much smaller capillaries than shown above. The use of an orifice or small valve to retard this flow rate is undesirable because of the tendency of these devices to clog with foreign matter and the difficulty of regulation of minute flows with a valve, in view of the very minute orifices required.

If the flow rate of the reactant is too fast, excessive amounts of this reactant will enter the reactor, resulting often in a violent reaction, producing heat, which further accelerates the reaction and which may cause the solution in the reactor to boil. This results in a great increase in the rate of gas generation, which may be beyond the capacity of the vacuum pump to remove, resulting in the development of a positive pressure in the reactor, which can cause liquid in the reactor to transfer over to the container holding the liquid reactant where it forms a gas which escapes into the air.

It is thus important that the flow of liquid reactant be restricted to such value that the rate of gas generation, when the liquid encounters the second reactant, will not be greater than the rate of removal of gas by the vacuum pump, and also so that the solution in the reactor will not boil. It has been found that, in general, this can be accomplished if the ratio of the cross-sectional area of the feed tubing to the surface area of the solution in the reactor does not exceed 1 to 5000 (0.0002). There is no limitation on the minimum area of the feed tubing, but of course the rate of gas generation will decrease with a reduction in diameter of this tubing.

The system of this invention tends to compensate for an excessive flow rate of liquid reactant at a given rate of gas removal by the vacuum pump. For instance, if the flow rate is somewhat high, gas will be produced at a higher rate, resulting in a reduction in the amount of vacuum in the reactor, which in turn diminishes the flow rate of the liquid reactant in view of the lesser suction at the discharge end of the tubing, thus retarding the reaction rate and resulting in a diminution of gas production and the restoration of the original vacuum. This cycling process, while it may be permissable provided a vacuum can be constantly maintained in the reactor, is undesirable and can be eliminated by reducing the flow rate of the reactant.

If the presence of air in the produced gas is tolerable, it is highly desirable to bleed a small amount of air into the reactor at all times when a vacuum is present. The air serves to displace the gas formed, removing it more rapidly from the reactor and cooling the reactor and the gas. Air bled into the reactor should enter beneath the surface of of the solution in the reactor, preferably, where it will stir and cool the solution. At the end of the reaction the air sweeps all traces of gas out of the reactor, thus lessening deterioration of the reactor and tubing where gases are corrosive.

The introduction of air can serve as a convenient means for controlling the vacuum in the system, such as by varying the diameter of the air flow tubing or by incorporating a vacuum regulator in the system. The reaction can be stopped by opening a valve in a high flow rate bleed line, destroying the vacuum and stopping the flow of the liquid reactant. Such valve can be automatically controlled by a time switch.

Where the generating gas is to be added to water, it is most convenient to use a Venturi vacuum pump, the gas merging with the water before delivery. In swimming pool use, the Venturi can be operated by a portion of the return line water, thus assuring that no gas will be produced unless the pool pump is operating. If leaks occur in any part of the vacuum system, or if the vacuum pump fails, gas production will stop. Thus the operation of the system is virtually fail safe. dr

DETAILED DESCRIPTION OF THE INVENTION

Figure 1:
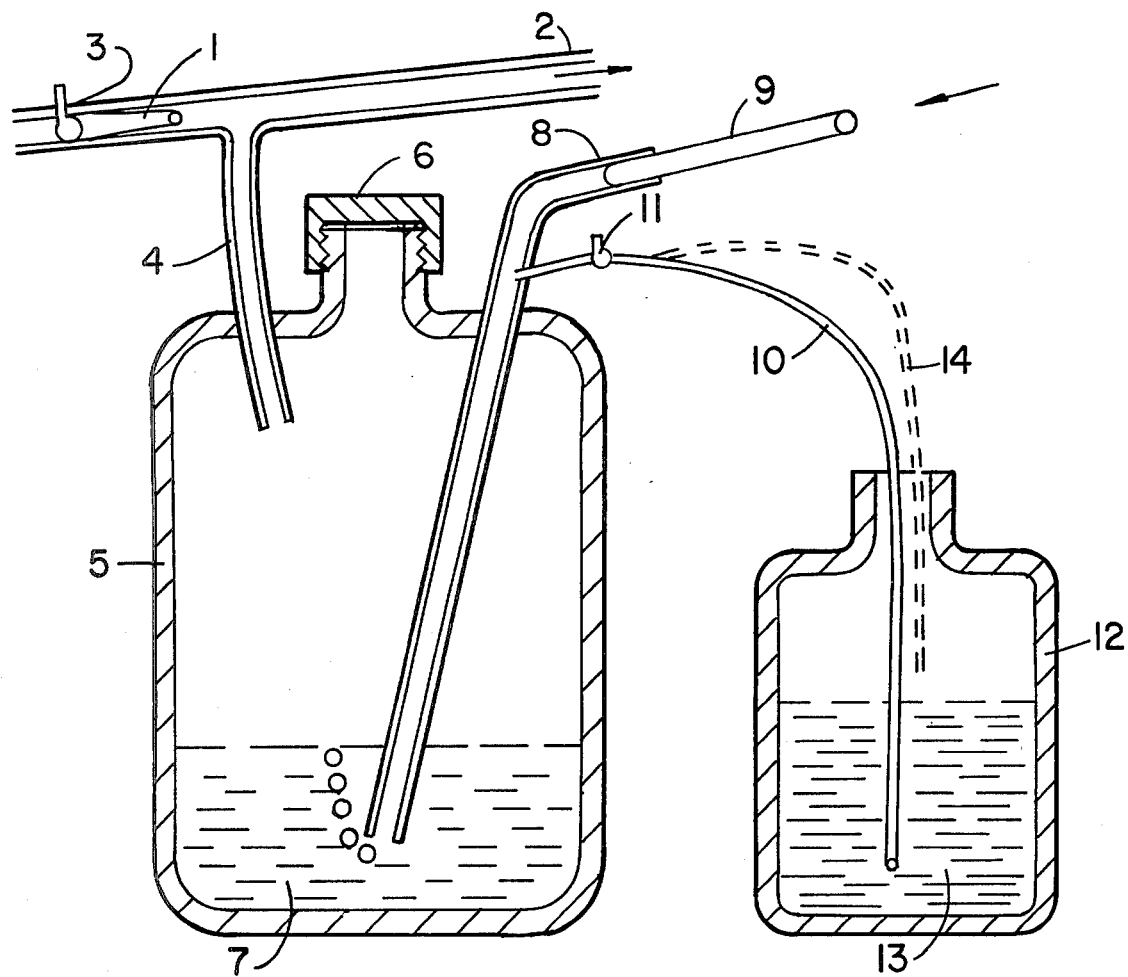
FIG. 1 shows a midsectional view of the reactor and the container for holding the liquid reactant and a Venturi type vacuum pump with connecting tubing.

Referring to FIG. 1, there is shown a Venturi vacuum pump, 1, through which a fluid flows through control valve 3. A vacuum tubing inlet, 4, conveys any gas produced in the reactor into the Venturi. A dispensing tube, 2, may be used to move the gas to where needed.

The reactor, 5, is hermetically sealed with a cap, 6, which affords access to its interior when loading it with a reactant, which should be dissolved in an aqueous solution, 7, to the extent of its solubility. The liquid reactant, 13, is held in a container, 12, and conveyed to the reactor by means of capillary delivery tubing, 10, and it enters the enlarged portion of air tubing, 8, at a point above the maximum level of the liquid reactant, 13, so that this liquid will not syphon off into the reactor when no vacuum is present. This anti-syphoning feature is important to assure fail safe operation.

Air may be admitted in small quantities into the reactor by means of tubing, 8. To regulate the air flow some portion of the tubing, 8, must have a restricted diameter, such as capillary tubing, 9, or the flow may be retarded by means of a valve or preferably by the use of a semi permeable flow restrictor or multi-capillary device, such as a porous filter. Another system for apportioning is shown in FIG. 2 and will be discussed later.

When a vacuum is produced in the system, liquid reactant, 13, is slowly sucked through tubing, 10, into the reactor, where it contacts the reactant solution, 7, initiating a reaction which produces a gas, which in turn is removed by means of tubing, 4, from the system and transferred to the vacuum pump, 1, where it emerges through a delivery tube, 2, and is conducted to where needed. When no vacuum is present, the liquid reactant, 13, stops flowing into the reactor and the reaction stops. The introduction of air beneath the surface of the solution in the reactor, causes bubbles to stir the solution and to intermix the liquid reactant with the solution, and to desorb the solution of gases. The production of gas may be stopped by closing valve, 11, in the delivery line or by moving the intake end of the delivery tubing above the level of the liquid reactant, 13, as shown in dotted lines, 14. The reaction also may be stopped by stopping the vacuum pump, such as by closing valve, 3, or by admitting large quantities of air into the system as is described below, or by closing valve 11.

Figure 2:
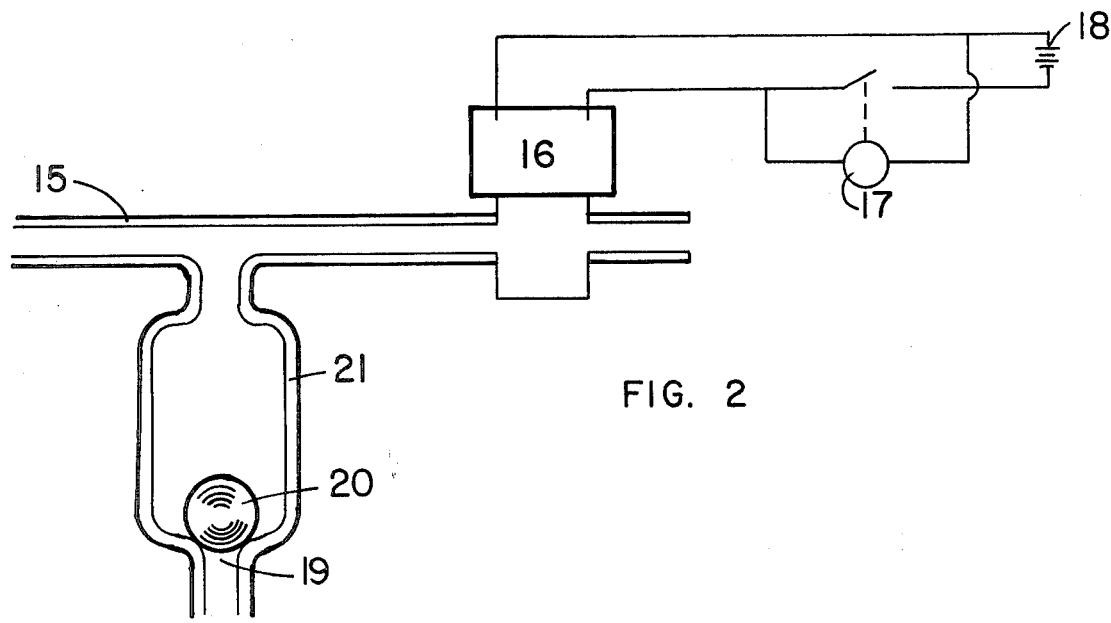
FIG. 2 shows a cross-sectional view through the mid section of a vacuum relief valve, or vacuum regulator, attached to a vacuum system incorporating an electrically operated solenoid valve, with circuitry for the valve shown in schematic form. The system is designed for the tubing on the left side to be connected to an air tube, 8, or to any other part of the vacuum system.

In the apparatus shown in FIG. 2, a tube, 15, is connected to the vacuum system of the reactor, as for instance by means of air tubing, 8. A conventional vacuum relief valve used in this system consists of a closed chamber, 21, with a ball, 20, held by gravity against a valve seat 19, which is open to the atmosphere. As vacuum increases the ball is raised off the seat admitting air into the system and thus stabilizing the pressure. In an alternate version the ball can be spring loaded rather than gravity loaded. This regulator operates as long as solenoid valve, 16 is closed. This valve is controlled by a time switch, 17, powered by a power source, 18, which controls the valve. Using this system the production of gas can be controlled by a time switch without interrupting the vacuum pump and since the operating vacuum will be constant, the amount of gas produced will correlate with the length of time the solenoid valve is closed. The use of the vacuum regulator is not essential to the operation of the automatic system but is desirable in order to assure accurate metering of the gas.

As stated before, the flow rate of the liquid reactant can be increased somewhat as the rate of gas removed by the vacuum pump increases, provided the temperature rise of the solution in the reactor is not raised excessively. This tends to automatically occur because, as the capacity of the vacuum pump increases, the amount of vacuum increases, if vacuum control is not used, thus increasing the suction at the discharge end of the delivery tubing and thus moving more liquid reactant into the reactor.

Where manual control is used, one very satisfactory method is to add a measured quantity of liquid reactant to container, 13, which will in turn produce a definite amount of gas. Or the location of the entrance end of the delivery tube, 10, can be raised to a given point, such as shown by dotted line, 14, thus assuring that only a desired amount of reactant will be used, thus producing a definite amount of gas. In this instance, and also in the automatic version described above, a large amount of reactant can be stored in the reactor and in the liquid container, the reaction stopping when the flow ceases through delivery tubing, 10, and re-occurs when the liquid reactant is later fed through the delivery tube. Thus the system may be charged at long intervals with reactants and still gas can be produced in desired amounts at shorter intervals at any time.

EXAMPLE

Using the system shown in FIG. 1, the reactor was loaded with 16 ounces of calcium hypochlorite to which was added a small amount of water. The delivery tube was 1.5 mm in inside diameter. The container was loaded with 24 ounces of concentrated hydrochloric acid. Water was circulated at 9 psi through a Venturi into a 16,000 gallon pool over a period of 50 minutes during which time all of the acid was delivered and the chlorine content of the pool was raised from 0.2 to 3.2 parts per million, more than three times the amount needed for sanitizing.

ALTERNATE APPARATUS

It should be recognized that other variations as shown may be substituted without departing from the scope of the claims. For instance, other types of vacuum pumps may replace the Venturi pump. Air may be admitted above the surface of the solution in the reactor, or it may be admitted at any point in the vacuum system. Automatic valves may be substituted for manually operated valves. Vacuum may be controlled by varying the energy into the pump. Also, the dispensing tube, 2, need not be used if the Venturi is located within the body of the water to be treated.

Although this invention has been directed toward the sanitizing of swimming pools, it may be utilized for the production of other gases besides the halogens.

What is claimed is:

1. Apparatus for safely generating and dispensing a gas, said gas being generated by chemical reaction of a first given liquid reactant with at least one other second given reactant in aqueous solution; said apparatus comprising a reactor with a gas tight closure for holding said second given reactant, said reactor being connected with vacuum tubing from an outlet in its upper area, above the level of liquid in the reactor, to the inlet of a vacuum pump; means for conducting atmospheric air to a point below the surface of the solution of said second given reactant inside of said reactor, said air bubbling through and stirring said solution in the reactor when the reactor is evacuated; a container for holding said first given liquid reactant under atmospheric pressure; delivery tubing for slowly transferring said first given liquid reactant into said reactor, at least a portion of said delivery tubing being of restricted cross section, said delivery tubing being in contact with said first given liquid reactant at the intake end and connected to an enlarged evacuated area within said reactor at the discharge end so that syphoning is prevented when vacuum is absent, said delivery tubing restricting the flow rate of said first given liquid reactant to such value that the resultant reaction, when said first and second given reactants contact each other will produce a temperature rise within said reactor that will remain below the boiling point of solution in the reactor and will produce gas at a lesser rate than the rate of removal of gas by said vacuum pump; means for connecting the discharge end of said delivery tubing to said air conducting means, thus assuring that said first given liquid reactant will be mechanically dispersed into said aqueous solution of said second given reactant via air bubbling through said aqueous solution; said reaction occuring when said first given reactant is sucked into the reactor through said delivery tubing, producing a gas when it contacts said second given reactant, the gas being removed from the reactor by the vacuum pump and dispensed through the discharge side of said vacuum pump.

2. Apparatus according to claim 1 wherein said vacuum pump is a Venturi pump through which a fluid passes, said gas merging with said fluid and being delivered at the discharge side of the pump.

3. Apparatus according to claim 1 including means to control the vacuum in said reactor.

4. Apparatus for safely generating and dispensing a gas, said gas being generating by chemical reaction of a first given liquid reactant with at least one other second given reactant in aqueous solution; said apparatus comprising a reactor with a gas tight closure for holding said second given reactant, said reactor being connected with vacuum tubing from an outlet in its upper area, above the level of liquid in the reactor, to the inlet of vacuum pump, the gas generated being dispensed from the outlet of the vacuum pump; a container for holding said first given liquid reactant under atmospheric pressure; and delivery tubing for slowly transferring said first given liquid reactant into said reactor, said delivery tubing incorporating a multicapillary flow restrictor within its length, said restrictor comprising a porous glass, ceramic or organic filter, said delivery tubing being in contact with said first given liquid reactant at its intake end and being connected to an enlarged area within said reactor at its discharge end so that syphoning is prevented when vacuum is absent, said delivery tubing restricting the flow rate of said first given reactant to such value that the reaction resulting when said first and second given reactants contact each other will produce a temperature rise that will not exceed the boiling point of solution in the reactor and will produce gas at a lesser rate than the rate of removal of gas by the vacuum pump, said reaction occurring when said first given liquid reactant is sucked into the reactor through said delivery tubing, producing a gas when it contacts said second given reactant, the gas being removed by the vvacuum pump and being dispensed through the discharge side of said vacuum pump.

5. Apparatus according to claim 4 including means to admit air into said reactor to aid in the removal of generated gas.

6. Apparatus according to claim 4, including means for conducting atmospheric air to a point beneath the surface of said solution of said second given reactant in the reactor, said air bubbling through and stirring the solution in the reactor, when the reactor is evacuated, and aiding in the intermixing of said first given liquid reactant with the solution of said second given reactant in the reactor.

7. Apparatus according to claim 6, including means to conduct said first given liquid reactant to the location where said air bubbles through said solution, thus assuring the intimate mixing of said first given and second given reactants in the reactor by the stirring action of the air.

* * * * *